(12) United States Patent
Malladi et al.

(10) Patent No.: US 8,081,598 B2
(45) Date of Patent: Dec. 20, 2011

(54) OUTER-LOOP POWER CONTROL FOR WIRELESS COMMUNICATION SYSTEMS

(75) Inventors: Durga P. Malladi, San Diego, CA (US); Tao Chen, La Jolla, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1061 days.

(21) Appl. No.: 10/756,957

(22) Filed: Jan. 13, 2004

(65) Prior Publication Data

US 2005/0007986 A1     Jan. 13, 2005

Related U.S. Application Data (60) Provisional application No. 60/448,269, filed on Feb. 18, 2003, provisional application No. 60/452,790, filed on Mar. 6, 2003, provisional application No. 60/470,770, filed on May 14, 2003.

(51) Int. Cl.
*H04W 4/00* (2009.01)
*H04L 1/00* (2006.01)
*H04L 27/06* (2006.01)

(52) U.S. Cl. ......... 370/329; 370/252; 370/230; 375/340

(58) Field of Classification Search .................. 370/253, 370/318, 345, 252, 230, 232–234; 455/515, 455/561, 522, 67.11; 379/1.03; 375/316, 375/340–341, 225, 227, 262, 265; 714/794–795
See application file for complete search history.

(56) References Cited

U.S. PATENT DOCUMENTS

| | | | |
|---|---|---|---|
| 2,149,518 | A | 3/1939 | Frank, Sr. |
| 3,470,324 | A | 9/1969 | Harmuth |
| 4,768,023 | A | 8/1988 | Xie |
| 5,280,472 | A | 1/1994 | Gilhousen et al. |
| 5,394,433 | A | 2/1995 | Bantz et al. |
| 5,406,585 | A | 4/1995 | Rohani et al. |
| 5,463,342 | A | 10/1995 | Guard |
| 5,483,557 | A | 1/1996 | Webb |
| 5,535,214 | A | 7/1996 | Shiobara |

(Continued)

FOREIGN PATENT DOCUMENTS

CN    1166094    11/1997

(Continued)

OTHER PUBLICATIONS

Attar et al., "A Reverse Link Outer-Loop Control Algorithm for cma2000 1xEV Systems," *IEEE International Conference on Communications* New York, NY, Apr. 28, 2002, pp. 573-578.

(Continued)

*Primary Examiner* — George Eng
*Assistant Examiner* — Nam Huynh
(74) *Attorney, Agent, or Firm* — D. Scott Juneau (57) ABSTRACT

Systems and methods for evaluating packets and frames in a wireless communication system having multiple reverse-link channels including a spontaneous, burst oriented transmission channel and its corresponding rate indicator channel. One embodiment comprises a base station monitoring the rate indicator channel, decoding the rate indicator channel using a maximum likelihood decoder and detecting the presence of a packet on the rate indicator channel by comparing a likelihood with a threshold, and analyzing the validity of a frame on the burst oriented channel based on the presence and content of packets received on the rate indicator channel.

34 Claims, 5 Drawing Sheets

U.S. PATENT DOCUMENTS

| | | | |
|---|---|---|---|
| 5,544,156 A | 8/1996 | Teder et al. |
| 5,553,062 A | 9/1996 | Schilling et al. |
| 5,581,575 A | 12/1996 | Zehavi et al. |
| 5,592,470 A | 1/1997 | Rudrapatna et al. |
| 5,627,938 A | 5/1997 | Johnston |
| 5,647,366 A | 7/1997 | Weng |
| 5,712,869 A | 1/1998 | Lee et al. |
| 5,719,852 A | 2/1998 | Schilling et al. |
| 5,726,978 A | 3/1998 | Frodigh et al. |
| 5,732,391 A | 3/1998 | Fiocca |
| 5,745,480 A | 4/1998 | Behtash et al. |
| 5,752,193 A | 5/1998 | Scholefield et al. |
| 5,754,537 A | 5/1998 | Jamal |
| 5,764,551 A | 6/1998 | McCorkle |
| 5,774,809 A | 6/1998 | Tuutijarvi et al. |
| 5,781,861 A | 7/1998 | Kang et al. |
| 5,809,059 A | 9/1998 | Souissi et al. |
| 5,815,526 A | 9/1998 | Rice |
| 5,857,174 A | 1/1999 | Dugan |
| 5,862,451 A | 1/1999 | Grau et al. |
| 5,864,760 A | 1/1999 | Gilhousen et al. |
| 5,875,214 A * | 2/1999 | Urbaniak et al. | 375/341 |
| 5,903,608 A | 5/1999 | Chun |
| 5,914,950 A | 6/1999 | Tiedemann, Jr. et al. |
| 5,923,650 A | 7/1999 | Chen et al. |
| 5,938,749 A | 8/1999 | Rusu et al. |
| 5,956,642 A | 9/1999 | Larsson et al. |
| 5,966,377 A | 10/1999 | Murai |
| 5,966,670 A | 10/1999 | Keskitalo et al. |
| 5,969,751 A | 10/1999 | Lee |
| 5,973,642 A | 10/1999 | Li et al. |
| 5,991,271 A | 11/1999 | Jones et al. |
| 5,991,273 A | 11/1999 | Abu-Dayya |
| 6,005,876 A | 12/1999 | Cimini, Jr. et al. |
| 6,014,373 A | 1/2000 | Schilling et al. |
| 6,046,980 A | 4/2000 | Packer |
| 6,049,716 A | 4/2000 | Jung |
| 6,052,594 A | 4/2000 | Chuang et al. |
| 6,061,359 A | 5/2000 | Schilling et al. |
| 6,064,692 A | 5/2000 | Chow |
| 6,085,091 A | 7/2000 | Yoo et al. |
| 6,088,387 A | 7/2000 | Gelblum et al. |
| 6,094,459 A | 7/2000 | Kao et al. |
| 6,108,374 A | 8/2000 | Balachandran et al. |
| 6,108,384 A * | 8/2000 | Okumura et al. | 375/262 |
| 6,111,911 A | 8/2000 | Sanderford et al. |
| 6,115,357 A | 9/2000 | Packer et al. |
| 6,128,283 A | 10/2000 | Sabaa et al. |
| 6,128,349 A | 10/2000 | Chow |
| 6,128,882 A | 10/2000 | Jones |
| 6,130,882 A | 10/2000 | Levin |
| 6,131,016 A | 10/2000 | Greenstein et al. |
| 6,134,215 A | 10/2000 | Agrawal et al. |
| 6,134,218 A | 10/2000 | Holden |
| 6,141,388 A | 10/2000 | Servais et al. |
| 6,144,654 A | 11/2000 | Ibanez-Meier et al. |
| 6,195,552 B1 | 2/2001 | Jeong et al. |
| 6,201,576 B1 | 3/2001 | Raghunath et al. |
| 6,201,954 B1 | 3/2001 | Soliman |
| 6,205,129 B1 | 3/2001 | Esteves et al. |
| 6,208,699 B1 * | 3/2001 | Chen et al. | 375/340 |
| 6,208,858 B1 | 3/2001 | Antonio et al. |
| 6,219,374 B1 | 4/2001 | Kim et al. |
| 6,222,875 B1 | 4/2001 | Dahlman et al. |
| 6,222,888 B1 | 4/2001 | Kao et al. |
| 6,233,455 B1 | 5/2001 | Ramakrishna et al. |
| 6,259,746 B1 | 7/2001 | Levin |
| 6,292,515 B1 | 9/2001 | Kao et al. |
| 6,298,041 B1 | 10/2001 | Packer |
| 6,307,844 B1 | 10/2001 | Tsunehara et al. |
| 6,335,922 B1 | 1/2002 | Tiedemann, Jr. et al. |
| 6,347,080 B2 | 2/2002 | Jou et al. |
| 6,363,255 B1 | 3/2002 | Kuwahara |
| 6,389,056 B1 | 5/2002 | Kanterakis et al. |
| 6,414,988 B1 | 7/2002 | Ling |
| 6,425,105 B1 | 7/2002 | Piirainen et al. |
| 6,442,130 B1 | 8/2002 | Jones, IV et al. |
| 6,456,653 B1 | 9/2002 | Sayeed |
| 6,483,816 B2 | 11/2002 | Tsunehara et al. |
| 6,490,461 B1 | 12/2002 | Muller |
| 6,496,496 B1 | 12/2002 | Ramakrishna et al. |
| 6,505,058 B1 | 1/2003 | Willey |
| 6,512,925 B1 | 1/2003 | Chen et al. |
| 6,532,363 B1 | 3/2003 | Pussinen |
| 6,535,723 B1 | 3/2003 | Jiang et al. |
| 6,549,561 B2 | 4/2003 | Crawford |
| 6,563,885 B1 | 5/2003 | Magee et al. |
| 6,570,444 B2 | 5/2003 | Wright |
| 6,571,101 B1 | 5/2003 | Schulz |
| 6,571,104 B1 | 5/2003 | Nanda et al. |
| 6,574,205 B1 | 6/2003 | Sato |
| 6,590,879 B1 | 7/2003 | Huang et al. |
| 6,597,913 B2 | 7/2003 | Natarajan |
| 6,609,007 B1 | 8/2003 | Eibling et al. |
| 6,654,609 B2 | 11/2003 | Kim |
| 6,680,925 B2 | 1/2004 | Wu et al. |
| 6,693,892 B1 | 2/2004 | Rinne et al. |
| 6,701,151 B2 | 3/2004 | Diachina et al. |
| 6,711,208 B2 | 3/2004 | Razoumov et al. |
| 6,741,862 B2 | 5/2004 | Chung et al. |
| 6,744,754 B1 | 6/2004 | Lee |
| 6,751,264 B2 | 6/2004 | Ho et al. |
| 6,751,444 B1 | 6/2004 | Meiyappan |
| 6,757,241 B1 | 6/2004 | Jones et al. |
| 6,760,303 B1 | 7/2004 | Brouwer |
| 6,775,544 B2 | 8/2004 | Ficarra |
| RE38,603 E | 9/2004 | Kim et al. |
| 6,816,827 B1 | 11/2004 | Xia et al. |
| 6,836,666 B2 | 12/2004 | Gopalakrishnan et al. |
| 6,847,826 B1 | 1/2005 | Wesby et al. |
| 6,847,828 B2 | 1/2005 | Miyoshi et al. |
| 6,865,389 B2 | 3/2005 | Lee et al. |
| 6,880,103 B2 | 4/2005 | Kim et al. |
| 6,898,418 B2 | 5/2005 | Rauschmayer |
| 6,904,286 B1 | 6/2005 | Dantu |
| 6,917,581 B2 | 7/2005 | Proctor, Jr. et al. |
| 6,937,582 B1 | 8/2005 | Kronestedt |
| 6,952,561 B1 | 10/2005 | Kumar et al. |
| 6,982,946 B2 | 1/2006 | Wiberg et al. |
| 6,987,798 B2 | 1/2006 | Ahn et al. |
| 7,006,429 B2 | 2/2006 | Yoshida et al. |
| 7,012,912 B2 | 3/2006 | Naguib et al. |
| 7,016,651 B1 | 3/2006 | Narasimhan |
| 7,031,741 B2 | 4/2006 | Lee et al. |
| 7,050,406 B2 | 5/2006 | Hsu et al. |
| 7,054,275 B2 | 5/2006 | Kim et al. |
| 7,061,986 B2 | 6/2006 | Tonissen et al. |
| 7,068,702 B2 | 6/2006 | Chen et al. |
| 7,069,038 B2 | 6/2006 | Hakkinen et al. |
| 7,072,315 B1 | 7/2006 | Liu et al. |
| 7,076,001 B2 | 7/2006 | Beadle et al. |
| 7,092,706 B2 | 8/2006 | Yang |
| 7,099,397 B2 | 8/2006 | Lee et al. |
| 7,103,021 B2 | 9/2006 | Jou |
| 7,120,134 B2 | 10/2006 | Tiedemann, Jr. et al. |
| 7,126,930 B2 | 10/2006 | Pankaj et al. |
| 7,155,236 B2 | 12/2006 | Chen et al. |
| 7,158,504 B2 | 1/2007 | Kadaba et al. |
| 7,164,669 B2 | 1/2007 | Li et al. |
| 7,177,367 B2 | 2/2007 | Storm |
| 7,187,646 B2 | 3/2007 | Schramm |
| 7,190,964 B2 | 3/2007 | Damnjanovic et al. |
| 7,197,085 B1 | 3/2007 | Vella-Coleiro |
| 7,215,930 B2 | 5/2007 | Malladi |
| 7,257,101 B2 | 8/2007 | Petrus et al. |
| 7,269,186 B2 * | 9/2007 | Abrol et al. | 370/476 |
| 7,269,389 B2 | 9/2007 | Petrus et al. |
| 7,272,199 B2 | 9/2007 | Storm et al. |
| 7,274,743 B2 | 9/2007 | Kim |
| 7,277,709 B2 | 10/2007 | Vadgama |
| 7,286,558 B2 * | 10/2007 | Kim et al. | 370/465 |
| 7,286,846 B2 | 10/2007 | Chen et al. |
| 7,289,529 B2 | 10/2007 | Sherman |
| 7,299,402 B2 | 11/2007 | Soong et al. |
| 7,313,167 B2 | 12/2007 | Yoon et al. |
| 7,317,711 B2 | 1/2008 | Bae et al. |
| 7,327,716 B2 | 2/2008 | Fong et al. |

| | | | |
|---|---|---|---|
| 7,336,640 B2 | 2/2008 | McDonough et al. | |
| 7,336,954 B2 | 2/2008 | Wang et al. | |
| 7,423,992 B2 | 9/2008 | Iwamura | |
| 7,447,258 B2 | 11/2008 | Pietila et al. | |
| 7,447,287 B1 | 11/2008 | Parantainen | |
| 7,463,702 B2 | 12/2008 | Ammer et al. | |
| 7,505,780 B2 | 3/2009 | Wei | |
| 7,660,282 B2 | 2/2010 | Sarkar | |
| 7,706,403 B2 | 4/2010 | Hosein | |
| 2001/0012271 A1 | 8/2001 | Berger | |
| 2001/0019541 A1* | 9/2001 | Jou et al. | 370/311 |
| 2002/0015388 A1* | 2/2002 | Kim et al. | 370/252 |
| 2002/0021683 A1 | 2/2002 | Holtzman et al. | |
| 2002/0021692 A1* | 2/2002 | Huh et al. | 370/352 |
| 2002/0051432 A1 | 5/2002 | Shin | |
| 2002/0056055 A1 | 5/2002 | Kim et al. | |
| 2002/0057730 A1* | 5/2002 | Karlsson et al. | 375/152 |
| 2002/0067774 A1 | 6/2002 | Razoumov et al. | |
| 2002/0093918 A1 | 7/2002 | Kim et al. | |
| 2002/0111183 A1 | 8/2002 | Lundby | |
| 2002/0131522 A1 | 9/2002 | Felgentreff | |
| 2002/0136271 A1 | 9/2002 | Hiramatsu et al. | |
| 2002/0137521 A1 | 9/2002 | Kim et al. | |
| 2002/0150077 A1 | 10/2002 | Temerinac | |
| 2002/0154610 A1 | 10/2002 | Tiedemann, Jr. et al. | |
| 2002/0160767 A1 | 10/2002 | Hanly | |
| 2002/0172192 A1 | 11/2002 | Hunzinger et al. | |
| 2002/0183039 A1 | 12/2002 | Padgett et al. | |
| 2002/0191677 A1 | 12/2002 | Chen et al. | |
| 2003/0028251 A1 | 2/2003 | Mathews | |
| 2003/0031130 A1 | 2/2003 | Vanghi | |
| 2003/0039317 A1 | 2/2003 | Taylor et al. | |
| 2003/0050084 A1 | 3/2003 | Damnjanovic et al. | |
| 2003/0050086 A1* | 3/2003 | Lee et al. | 455/522 |
| 2003/0073443 A1* | 4/2003 | Bae et al. | 455/450 |
| 2003/0081538 A1 | 5/2003 | Walton et al. | |
| 2003/0083069 A1 | 5/2003 | Vadgama | |
| 2003/0123392 A1 | 7/2003 | Ruutu et al. | |
| 2003/0129981 A1 | 7/2003 | Kim | |
| 2003/0137953 A1 | 7/2003 | Chae et al. | |
| 2003/0142656 A1 | 7/2003 | Padovani et al. | |
| 2003/0152102 A1* | 8/2003 | Morgan et al. | 370/465 |
| 2003/0161340 A1 | 8/2003 | Sherman | |
| 2003/0219037 A1 | 11/2003 | Toskala et al. | |
| 2004/0013102 A1 | 1/2004 | Fong et al. | |
| 2004/0091067 A1* | 5/2004 | Ammer et al. | 375/341 |
| 2004/0101035 A1 | 5/2004 | Boer et al. | |
| 2004/0160914 A1 | 8/2004 | Sarkar | |
| 2004/0160922 A1 | 8/2004 | Nanda et al. | |
| 2004/0160933 A1 | 8/2004 | Odenwalder et al. | |
| 2004/0162083 A1 | 8/2004 | Chen et al. | |
| 2004/0162098 A1 | 8/2004 | Wei et al. | |
| 2004/0203973 A1 | 10/2004 | Khan | |
| 2004/0224711 A1 | 11/2004 | Panchal et al. | |
| 2004/0228349 A1 | 11/2004 | Vrzic et al. | |
| 2004/0228389 A1 | 11/2004 | Odenwalder | |
| 2005/0002324 A1 | 1/2005 | Sutivong et al. | |
| 2005/0004970 A1 | 1/2005 | Jain et al. | |
| 2005/0176456 A1 | 8/2005 | Chen et al. | |
| 2005/0254465 A1 | 11/2005 | Lundby et al. | |
| 2006/0007892 A1 | 1/2006 | Sudo | |
| 2006/0019701 A1 | 1/2006 | Ji | |
| 2006/0128410 A1 | 6/2006 | Derryberry et al. | |
| 2006/0165126 A1 | 7/2006 | Petersson et al. | |
| 2006/0183497 A1 | 8/2006 | Paranchych et al. | |
| 2006/0215737 A1 | 9/2006 | Bang et al. | |
| 2006/0264220 A1 | 11/2006 | Chen et al. | |
| 2007/0111669 A1 | 5/2007 | Malladi | |
| 2008/0043683 A1 | 2/2008 | Kwon et al. | |
| 2008/0194286 A1 | 8/2008 | Chen et al. | |

FOREIGN PATENT DOCUMENTS

| | | |
|---|---|---|
| CN | 1263675 | 8/2000 |
| EP | 0627827 A2 | 12/1994 |
| EP | 0783210 A2 | 7/1997 |
| EP | 0809364 A2 | 11/1997 |
| EP | 0921652 A2 | 6/1999 |
| EP | 0996304 A1 | 4/2000 |
| EP | 1104127 | 5/2001 |
| EP | 1231807 A2 | 8/2002 |
| EP | 1236471 A2 | 9/2002 |
| EP | 1257140 A1 | 11/2002 |
| EP | 1292057 | 3/2003 |
| EP | 1292057 A1 | 3/2003 |
| EP | 1326471 | 12/2008 |
| GB | 2301687 A | 12/1996 |
| GB | 2352944 A | 2/2001 |
| JP | 08298498 A | 12/1996 |
| JP | 10013325 A | 1/1998 |
| JP | 11154919 A | 6/1999 |
| JP | 11196043 | 7/1999 |
| JP | 11508417 T | 7/1999 |
| JP | 2000299680 A | 10/2000 |
| JP | 2000513549 | 10/2000 |
| JP | 2000349740 | 12/2000 |
| JP | 2001016139 A | 1/2001 |
| JP | 2001036500 A | 2/2001 |
| JP | 2001238269 A | 8/2001 |
| JP | 2001515300 T | 9/2001 |
| JP | 2001517017 | 10/2001 |
| JP | 2002-026808 | 1/2002 |
| JP | 200277984 | 3/2002 |
| JP | 2002508137 T | 3/2002 |
| JP | 2002508896 T | 3/2002 |
| JP | 2002159061 A | 5/2002 |
| JP | 2002522988 T | 7/2002 |
| JP | 2002-232943 | 8/2002 |
| JP | 2002528954 T | 9/2002 |
| JP | 2002531992 | 9/2002 |
| JP | 2002534020 | 10/2002 |
| JP | 2003008521 A | 1/2003 |
| JP | 2003018117 | 1/2003 |
| JP | 2003032218 | 1/2003 |
| JP | 2003060606 A | 2/2003 |
| JP | 2003060609 A | 2/2003 |
| JP | 2003069523 A | 3/2003 |
| JP | 2004032518 A | 1/2004 |
| JP | 2004166038 A | 6/2004 |
| JP | 2004214746 | 7/2004 |
| JP | 2004320679 A | 11/2004 |
| JP | 2005-505955 | 2/2005 |
| JP | 2005505168 | 2/2005 |
| JP | 2008072733 A | 3/2008 |
| KR | 19960015862 | 11/1996 |
| KR | 0156478 B1 | 11/1998 |
| KR | 100214293 | 5/1999 |
| KR | 20020076991 | 10/2002 |
| KR | 20020089164 | 11/2002 |
| KR | 100406531 | 11/2003 |
| RU | 2073913 C1 | 2/1997 |
| RU | 2111619 C1 | 5/1998 |
| RU | 2115246 C1 | 7/1998 |
| RU | 2120198 C1 | 10/1998 |
| RU | 2149518 C1 | 5/2000 |
| RU | 2183910 C2 | 6/2002 |
| RU | 2189696 C2 | 9/2002 |
| WO | WO9205556 A1 | 4/1992 |
| WO | WO9507578 A1 | 3/1995 |
| WO | WO9510144 A1 | 4/1995 |
| WO | WO9512297 A1 | 5/1995 |
| WO | WO9701256 A1 | 1/1997 |
| WO | WO9733399 A1 | 9/1997 |
| WO | 9836606 | 8/1998 |
| WO | WO9835525 A2 | 8/1998 |
| WO | WO9901994 A2 | 1/1999 |
| WO | WO9904525 | 1/1999 |
| WO | WO9907089 A1 | 2/1999 |
| WO | WO9912282 A1 | 3/1999 |
| WO | WO9929054 A1 | 6/1999 |
| WO | WO0008869 A2 | 2/2000 |
| WO | WO0038444 | 6/2000 |
| WO | WO0042752 A1 | 7/2000 |
| WO | WO0048328 A1 | 8/2000 |
| WO | WO0065743 A1 | 11/2000 |
| WO | WO0072622 A1 | 11/2000 |
| WO | WO0106714 | 1/2001 |
| WO | WO0110159 A1 | 2/2001 |
| WO | WO0117158 A1 | 3/2001 |

| | | |
|---|---|---|
| WO | WO0124568 A1 | 4/2001 |
| WO | WO0141318 A2 | 6/2001 |
| WO | 0199303 | 12/2001 |
| WO | 0199312 | 12/2001 |
| WO | 0201762 | 1/2002 |
| WO | 0233838 | 4/2002 |
| WO | WO0231991 | 4/2002 |
| WO | 0237693 | 5/2002 |
| WO | WO 0237693 A2 * | 5/2002 |
| WO | WO0241531 A2 | 5/2002 |
| WO | 02063818 | 8/2002 |
| WO | WO02065664 | 8/2002 |
| WO | WO02065664 A2 | 8/2002 |
| WO | 02080400 | 10/2002 |
| WO | WO02095960 | 11/2002 |
| WO | WO03084163 A1 | 10/2003 |
| WO | WO2005015942 A1 | 2/2005 |

OTHER PUBLICATIONS

Sohn et al., "Blind Rate Detection Algorithm in WCDMA Mobile Receiver," *IEEE 54$^{th}$ Vehicular Technology Conference Preceedings*, Atlantic City, NJ, Oct. 7, 2001, pp. 1589-1592, XP010562230.
Sarkar S., et al., "cdma2000 Reverse Link: Design and System Performance", 2000 IEEE, vol. 6. pp. 2713-2719, Sep. 24, 2000.
Sarkar S., et al., "Adaptive Control of the Reverse Link in cdma2000", International Journal of Wireless Information Networks, vol. 9, No. 1, pp. 55-70 Jan. 2002.
International Search Report, PCT/US2004/004790 International Search Authority European Patent Office Mar. 7, 2005.
Written Opinion, PCT/US2004/004790 International Search Authority European Patent Office Mar. 7, 2005.
International Preliminary Report on Patentability PCT/US2004/004790. IPEA/US. Oct. 2, 2006.
3rd Generation Partnership Proect, Technical Specification Group Radio Access Network: 3GPP TS 25.322 V4.7.0; Radio Access Link Control (RLC) Protocol Specification; Release 4, Dec. 2002, pp. 1-76.
TIA EIA interim Standard IS-856-1, 'CDMA.2000 High Rate Packet Data Air Interface Specification. Addendum I,' Jan. 2002. pp. 9-23-9-57, XP002299790.
"Mobile Station-Base Station Compatibility Standard for Wideband Spread Spectrum Cellular Systems," TIA/EIA Interim Standard, Feb. 3, 1999, XP002145331, pp. 6-380, 6 (TIA/EIA-95-B).
"The cdma2000 ITU-R RTT Candidate Submission (0.18)," Telecommunications Industry Association TIA, Jul. 27, 1998, XP002294165, pp. 1-145.
"Universal Mobile Telecommunications System (UMTS); Physical channels and mapping of transport channels onto physical channels (FDD) (3GPP TS 25.211 version 5.3.0 Release 5)", ETSI TS 125 211 v 5.3.0, Dec. 2002, pp. 1-52.
3G TS 25.211 "Physical channels and mapping of transport channels onto physical channels (FDD)", Release 5, V5.0.0, Mar. 2002.
3G TS 25.212 "Multiplexing and channel coding (FDD)", Release 5, V5.0.0, Mar. 2002.
3G TS 25.213 "Spreading and modulation (FDD)", Release 5, V5.0. 0, Mar. 2002.
3G TS 25.214 "Physical layer procedures (FDD)", Release 5, V5.0.0, Mar. 2002.
3rd Generation Partnership Project, Technical Specification Group Radio Access Network: 3GPP TS 25.322 V4.7.0; Radio Access Link Control (RLC) Protocol Specification; Release 4, Dec. 2002, pp. 1-76.
Chen, Tau, "Method and Apparatus for Forward Link Power Control During Soft Handoff in a Communication System", U.S. Appl. No. 60/356,929 entitled, filed Feb. 12, 2002, QUALCOMM Incorporated.
Gyung-Ho Hwang et al. Distributed Rate Control for Throughput Maximization and DOS Support in WCDMA System', 2001 IEEE, Oct. 7-11, 2001, pp. 1721-1725.
Hamaguchi, et al., "Characteristics of Orthogonal Slow-FH/16QAM method applying Interference-resistant Demodulation," Proceedings of Inst. of Electronics, Information and Communication Engineers, B-II, Jun. 25, 1995, vol. J78, B-II, No. 6, pp. 445-453.
Nandagopal T et al: "Service differentiation through end-to-end rate control in low bandwidth wireless packet networks" Mobile Multimedia Communications, 1999. 1999 IEEE International workshop on San Diego, CA USA Nov. 15-17, 1999 Piscataway, NJ, USA IEEE.
Sunay, M, Oguz, et al.: "Provision of Variable Data Rates in Third Generation Wideband DS CDMA System," wireless Communications and Networking Conference, 1999, Sep. 21, 1999, pp. 505-509.
TIA/EIA-95; "Mobile Station- Base Station Compatibility Standard for Wideband Spread Spectrum Cellular Systems"(Apr. 1999).
You Y--H, et al.:MC-VSG BNET System for High-Rate Wireless Personal Area Network Applications, IEEE Transactions on Consumer Electronics, IEEE Inc., New York US, vol. 48, No. 2, May 2002, pp. 254-264.
Young-Joo Song et al. "Rate-control Snoop: A Reliable Transport Protocol for Heterogeneous Networks with Wired and Wireless Links", IEEE Proceedings 2003, vol. 2, Mar. 16, 2003, pp. 1334-1338.
Young-Uk Chung et al, "An Efficient Reverse Link Data Rate Control Scheme for 1xEV-DV System," IEEE 54TH. Vehicular Technology Conference Proceedings. Atlantic City, NJ, Oct. 7-11, 2001. IEEE, US. vol. 1 of 4, Conf. 54, Oct. 10, 2001, pp. 820-823.
3GPP2 C: "CDMA 2000 High Rate Packet Data Air Interface Specification C.S0024" 3GPP Standards, Sep. 12, 2000, XP002206456 cited in the application.
Chakravarty S et al: "An Algorithm for Reverse Traffic Channel Rate Control for cdma2000 High Rate Packet Data Systems GLOBECOM"01. 2001 IEEE Global Telecommunications Conference. San Antonio, TX, Nov. 25-29, 2001, IEEE Global Telecommunications Conference, New York, NY: IEEE, US, x. vol. 6 of 6, Nov. 25, 2001, pp. 3733-3737, XP002277693.
Taiwanese Search report -093103844—TIPO—Oct. 21, 2010.
3GPP2 C.S0024, Version 2.0: "cdma2000 High Rate Packet Data Air Interface Specification," pp. 1-441 (Oct. 27, 2000).
Adachi, F., et al., "Wideband Multi-rate DS-CDMA for Next Generation Mobile Communications Systems," Wireless Communications Conference (1997). Boulder, CO, USA Aug. 11-13, 1997, New York, NY, USA, IEEE, (Aug. 11, 1997), pp. 57-62, XP010245557, DOI:10.1109/WCC.1997.622247, ISBN: 978-0-7803-41 94-4.
ETSI TS 125.211 v3.5.0 (Dec. 2000);Universal Mobile Telecommunications Systems (UMTS); Physical channels and mapping of transport channels onto physical channels (FDD), 3GPP TS 25.211 version 3.5.0 Release 1999).
European Search Report—EP10172964 ,Search Authority -Berlin Patent Office, Sep. 28, 2010.
European Search Report—EP10178999, Search Authority—Munich Patent Office, Nov. 11, 2010.
European Search Report—EP10179617, Search Authority—Munich Patent Office, Nov. 5, 2010.
Fujii, T., et al., "Best Effort Cell Structure Using Sub-carrier Selected MC-CDMA System," The Institute of Electronics, Information and Communication Engineers, Nov. 15, 2002, vol. 102, No. 465, pp. 65-72, IEICE Technical Report RCS 2002-203 (English Abstract).
Schreiber, W. F: "Spread- Spectrum Television Broadcasting", SMPTE Journal, SMPTE Inc. Scarsdale, N.Y, US, vol. 101, No. 8, Aug. 1, 1992, pp. 538-549, XP000296026, ISSN: 0036-1682.
Sklar, B. "Digital Communications, Fundamentals and Applications", 4 pages, 2001. Prentice-Hall PTR. Upper Saddle River, New Jersey, USA.
Taiwan Search Report—TW093123293—TIPO—Mar. 21, 2011.
Taiwan Search Report—TW093123295—TIPO—Feb. 24, 2011.
Taiwan Search Report—TW093123301—TIPO—Feb. 27, 2011.
TIA/EIA-IS-2000 Release C, "Introduction to cdma2000 Standards for Spread Spectrum Systems, Release C" (3GPP2 C.S0001-C, Version 1.0) May 28, 2002.
Translation of Office Action in Japanese application 2006-522734 corresponding to U.S. Appl. No. 10/783,083, citing JP2002534020 dated Jan. 25, 2011.

* cited by examiner

OUTER-LOOP POWER CONTROL FOR WIRELESS COMMUNICATION SYSTEMS

CLAIM OF PRIORITY UNDER 35 U.S.C. §119

The present Application for Patent claims priority to Provisional Application No. 60/448,269 entitled "Reverse Link Data Communication" filed Feb. 18, 2003, Provisional Application No. 60/452,790 entitled "Method and Apparatus for a Reverse Link Communication in a Communication System" filed Mar. 6, 2003 and Provisional Application No. 60/470,770 entitled "Outer-Loop Power Control for Rel. D" filed May 14, 2003, and all of which are assigned to the assignee hereof and hereby expressly incorporated by reference herein.

BACKGROUND

1. Field

The invention relates generally to the field of telecommunications, and more specifically to mechanisms for detecting and evaluating packets and frame transmissions in a wireless communication system having multiple channels with varying channel qualities.

2. Background

Wireless communication technologies are rapidly advancing, and wireless communication systems are utilized to provide a larger and larger portion of the communications capacity that is currently available to users. This is true despite the additional technological impediments that are faced in implementing a wireless communication system, as compared to a wireline system. For instance, wireless communication systems must deal with issues relating to data transmission between a base station and its mobile stations in order to maximize the performance of the system, whereas a wireline system does not.

One type of wireless communication system comprises a cellular CDMA2000 (code division multiple access) system which is configured to support voice and data communications. This system may have multiple base stations which communicate via wireless channels with multiple mobile stations. (The base stations are also typically coupled via wireline networks to various other systems, such as a public switched telephone network.) Each base station communicates with a set of mobile stations that are within a sector corresponding to the base station. This base station is responsible for detecting errors in transmissions from the mobile station in order to properly demodulate and decode the signal from the mobile stations in addition to controlling power in communications between the base station and the mobile stations in order to minimize interference and maximize throughput, as well as enabling the mobile stations to conserve energy and thereby extend the amount of time during which they can be used.

Typically, a cyclical redundancy check (CRC) is utilized to detect errors in transmissions from the mobile stations. Ideally, transmissions are divided into predetermined lengths and divided by a fixed divisor. The remainder number from this division operation is then appended onto the transmission by the mobile station. Upon receiving the transmission, the base station recalculates the remainder and compares it to the received remainder. If the two remainders do not match, the base station has detected an error in the transmission.

This method for error detection, however, may not be feasible for certain types of transmission channels. Burst oriented data transmission channels may have a corresponding rate indicator channel which signals a base station of the transmit format of the burst oriented channel and drives the power control loop. While a CRC may allow error detection in data transmissions, in systems having channels which transmit sporadically and are burst oriented the overhead for utilizing a CRC on their corresponding rate indicator channel may be too high. In most cases, a CRC requires 8 to 10 bits to be appended to each data transmission, however, on a rate indicator channel a transmission itself may only consist of a few bits at a time. The transmission of these added CRC bits increases transmission power significantly. This is problematic, however, as the base station still requires high probability identification of good and bad frames on this rate indicator channel in order to detect the transmit format of these enhanced channels and for adjustment of the power control loop.

There is therefore a need in the art for systems and methods which allow identification of packets on a rate indicator channel, and the high probability identification of good and bad frames on the rate indicator channel and the corresponding spontaneous data transmission channel.

SUMMARY

Embodiments disclosed herein address the above stated needs by providing systems and methods which allow reliable detection and evaluation of packets and transmission frames with low overhead.

Some wireless communication systems have a burst oriented channel and an accompanying rate indicator channel. Rather than performing error detection based upon a system carrying an unreasonable overhead for CRC, it is desirable to provide low overhead, high probability, identification of bad frames within a channel.

Various embodiments of the present invention attempt to improve the detection of packets and evaluation of frames in systems having a spontaneous, burst oriented data transmission channel and an accompanying rate indicator channel. More specifically, the presence of packets on a rate indicator channel is analyzed, and based upon the presence of packets on this channel, and the type of packets present, the validity of one or more frames may be determined. The presence of data on the corresponding data transmission channel may also be used to confirm this determination.

One embodiment comprises a method for evaluating packets and frames in a wireless communication system having a burst oriented channel and a corresponding rate indicator channel, comprising decoding the rate indicator channel using a maximum likelihood decoder and detecting the presence of a packet on the rate indicator channel based on a likelihood. In one embodiment, the rate indicator channel is decoded at predetermined intervals. After the detection of a packet, the packet is analyzed to determine whether or not it is valid. If the packet is a zero-rate packet and was expected, energy may be detected on the corresponding burst oriented data channel to make a further determination whether the zero-rate packet is valid. If the packet is not a zero-rate packet, in this embodiment the sub-packet identifier and the payload contained in the packet may be analyzed, and if they contradict expectations, the information in the packet may be used to decode the corresponding burst oriented channel to make a further determination as to whether the current packet or the previous packets are invalid. However, if no packet is detected on the rate indicator channel, and no packet was expected, the burst oriented data channel may be analyzed. In this manner a packet may be detected on the rate indicator channel and the validity of transmission frames determined.

An alternative embodiment of the invention comprises a wireless communication system comprising a base station and a mobile station coupled to the base station via a wireless communication link, wherein the base station is configured to receive data from the mobile station on a plurality of reverse-link channels on the wireless communication link including a burst oriented channel, and a corresponding rate indicator channel, and wherein the base station is configured to decode the rate indicator channel using a maximum likelihood decoder and determine the presence of a packet on the rate indicator channel based on a likelihood. In one embodiment, the rate indicator channel is decoded at a predetermined interval. After the detection of a packet, the validity of a frame may be determined. If a packet is detected this packet is analyzed. If the packet is a zero-rate packet and was expected, energy may be detected on the corresponding burst oriented data channel to make a further determination of whether the zero-rate packet is valid. If the packet is not a zero-rate packet, the sub-packet identifier and the payload contained in the frame may be analyzed, and if they contradict expectations the information in the packet may be used to decode the corresponding burst oriented channel. However, if no packet is detected on the rate indicator channel, and no packet was expected, the burst oriented data channel may be tested for energy. In this manner a packet may be detected on the rate indicator channel and the validity of transmission frames may be determined.

Numerous additional embodiments are also possible.

BRIEF DESCRIPTION OF THE DRAWINGS

Various aspects and features of the invention are disclosed by the following detailed description and the references to the accompanying drawings, wherein.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described.

DETAILED DESCRIPTION

One or more embodiments of the invention are described below. It should be noted that these and any other embodiments described below are exemplary and are intended to be illustrative of the invention rather than limiting.

As described herein, various embodiments of the invention comprise systems and methods for providing packet error detection in a rate indicator channel and its corresponding data transmission channel wherein a high probability of error detection is provided with low overhead.

A few terms are defined or clarified to aid in understanding the descriptions that follow. A packet may be understood in the context of this disclosure as a discreet piece of a message or a series of bits. A transmission frame (frame) may be understood as transmissions on one or more channels for a particular segment of time.

In one embodiment, a wireless communication system provides multiple reverse-link channels for communication of data from a mobile station to a base station. These channels include a burst oriented transmission channel (also referred to herein as a traffic channel) and its corresponding rate indicator channel. In order to detect the presence of packets on the rate indicator channel, the channel is monitored and decoded utilizing a maximum likelihood decoder. Based on the likelihood that a particular packet was received and a comparison of this likelihood to a threshold value, a determination can be made as to whether a packet is present. The maximum likelihood decoder is used because in contrast to conventional channels, no CRC information is provided in packets on the rate indicator channel.

Based on this detection of packets on the rate indicator channel, the validity of a transmission frame may be evaluated. Additionally, in many cases, the information on the corresponding burst oriented transmission channel is used to help evaluate the validity of the transmission frames. If a zero-rate packet was detected on the rate indicator channel, yet there is enough energy present on the data transmission channel, a bad transmission frame may be declared. Conversely, if a packet detected on the rate indicator channel indicates the presence of information on the data transmission channel, but the data transmission channel cannot be decoded correctly, a bad transmission frame may also be declared.

Although exemplary embodiments of the systems and methods presented are utilized throughout the present disclosure in the context of a CDMA2000 reverse enhanced supplemental channel (R-ESCH) and its accompanying reverse rate indicator channel (R-RICH), it will be understood by those skilled in the art that embodiments of the present invention may be utilized with other burst oriented communication channels and accompanying rate indicator channels.

A preferred embodiment of the invention is implemented in a wireless communication system that conforms generally to a release of the CDMA2000 specification. CDMA2000 is a 3rd Generation (3G) wireless communication standard that is based on the IS-95 standard. The CDMA2000 standard has evolved and continues to evolve to continually support new services in a standard 1.25 MHz carrier. The preferred embodiment of the invention is intended to be operable in systems utilizing Release D of the CDMA2000 standard, but other embodiments may be implemented in other Releases of CDMA2000 or in systems that conform to other standards (e.g., W-CDMA). The embodiments described herein should therefore be considered exemplary, rather than limiting.

Figure 1:
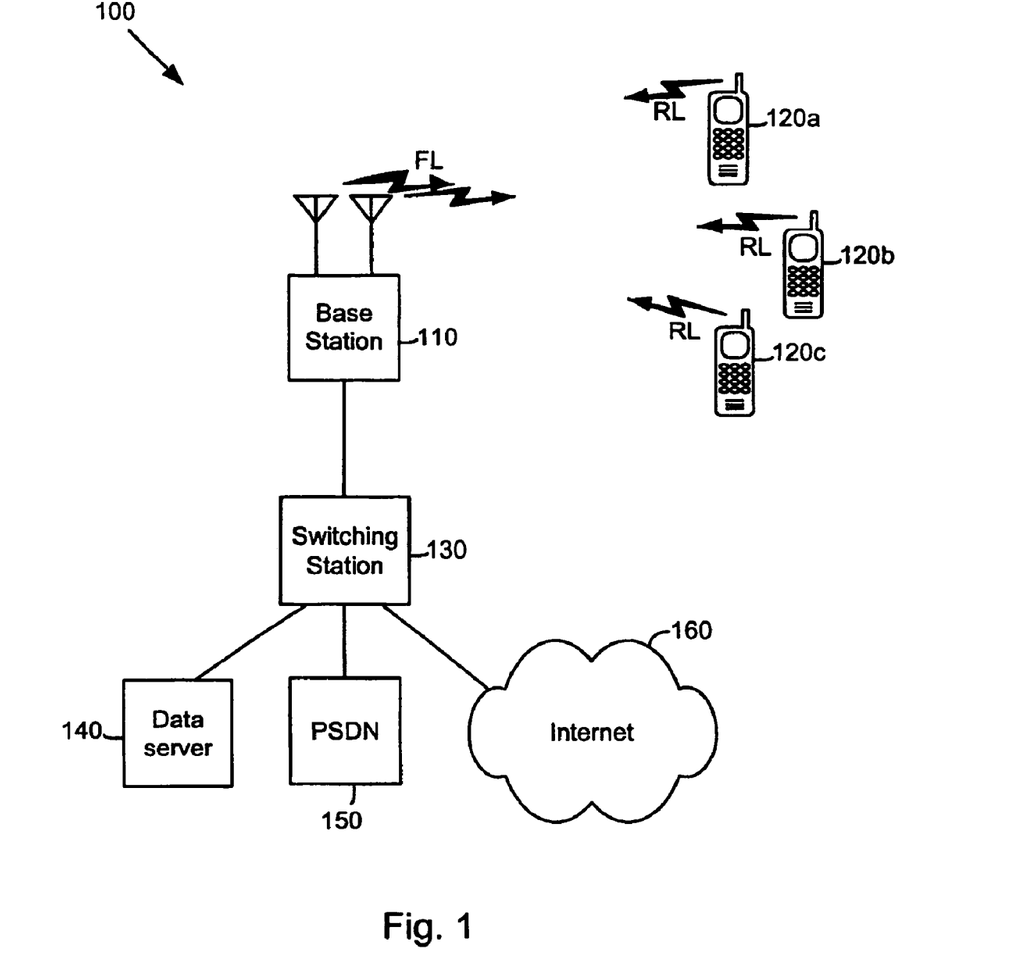
FIG. 1 is a diagram illustrating the structure of an exemplary wireless communications system in accordance with one embodiment.

Referring to FIG. 1, a diagram illustrating the structure of an exemplary wireless communications system is shown. As depicted in this figure, system 100 comprises a base station 110 that is configured to communicate with a plurality of mobile stations 120. Mobile stations 120 may, for example, be cellular telephones, personal information managers (PIMs) or PDAs), or the like that are configured for wireless communication. It should be noted that these devices need not actually be "mobile," but may simply communicate with base station 110 via a wireless link. Base station 110 transmits data to mobile stations 120 via corresponding forward link (FL) channels, while mobile stations 120 transmit data to base station 110 via corresponding reverse link (RL) channels.

It should be noted that, for the purposes of this disclosure, identical items in the figures may be indicated by identical reference numerals followed by a lowercase letter, e.g., 120a, 120b, and so on. The items may be collectively referred to herein simply by the reference numeral.

Base station 110 is also coupled to a switching station 130 via a wireline link. The link to switching station 130 allows base station 110 to communicate with various other system components, such as a data server 140, a public switched telephone network 150, or the Internet 160. It should be noted that the mobile stations and system components in this figure are exemplary and other systems may comprise other types and other combinations of devices.

While, in practice, the specific designs of base station 110 and mobile stations 120 may vary significantly, each serves as a wireless transceiver for communicating over the forward and reverse links. Base station 110 and mobile stations 120 therefore have the same general structure. This structure is illustrated in FIG. 2.

Figure 2:
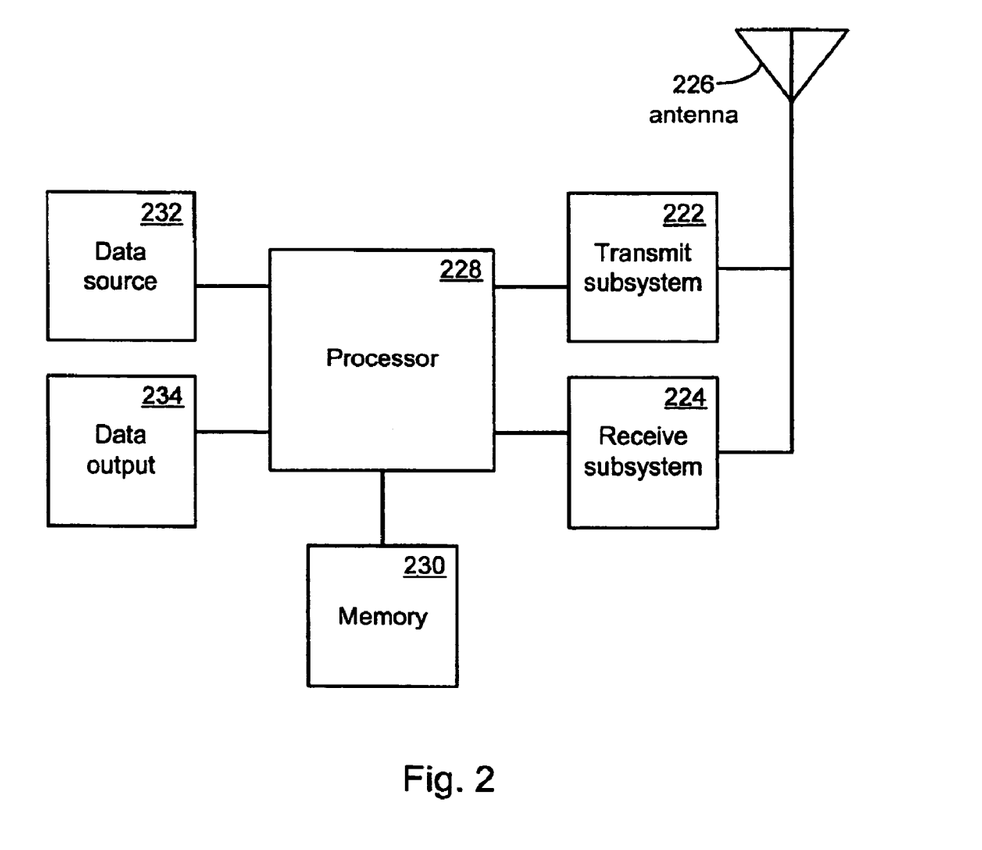
FIG. 2 is a functional block diagram illustrating the basic structural components of a wireless transceiver system in accordance with one embodiment.

Referring to FIG. 2, a functional block diagram illustrating the basic structural components of a wireless transceiver system in accordance with one embodiment is shown. As depicted in this figure, the system comprises a transmit subsystem 222 and a receive subsystem 224, each of which is coupled to an antenna 226. Transmit subsystem 222 and receive subsystem 224 may be collectively referred to as a transceiver subsystem. Transmit subsystem 222 and receive subsystem 224 access the forward and reverse links through antenna 226. Transmit subsystem 222 and receive subsystem 224 are also coupled to processor 228, which is configured to control transmit and receive subsystems 222 and 224. Memory 230 is coupled to processor 228 to provide working space and local storage for the processor. A data source 232 is coupled to processor 228 to provide data for transmission by the system. Data source 232 may, for example, comprise a microphone or an input from a network device. The data is processed by processor 228 and then forwarded to transmit subsystem 222, which transmits the data via antenna 226. Data received by receive subsystem 224 through antenna 226 is forwarded to processor 228 for processing and then to data output 234 for presentation to a user. Data output 234 may comprise such devices as a speaker, a visual display, or an output to a network device.

Persons of skill in the art of the invention will appreciate that the structure depicted in FIG. 2 is illustrative and that other embodiments may use alternative configurations. For example, processor 350, which may be a general-purpose microprocessor, a digital signal processor (DSP) or a special-purpose processor, may perform some or all of the functions of other components of the transceiver, or any other processing required by the transceiver. The scope of the claims appended hereto are therefore not limited to the particular configurations described herein.

Considering the structure of FIG. 2 as implemented in a mobile station, the components of the system can be viewed as a transceiver subsystem coupled to a processing subsystem, where the transceiver subsystem is responsible for receiving and transmitting data over wireless channel and the processing subsystem is responsible for preparing and providing data to the transceiver subsystem for transmission and receiving and processing data that it gets from the transceiver subsystem. The transceiver subsystem could be considered to include transmit subsystem 222, receive subsystem 224 and antenna 226. The processing subsystem could be considered to include processor 228, memory 230, data source 232 and data output 234.

Figure 3:
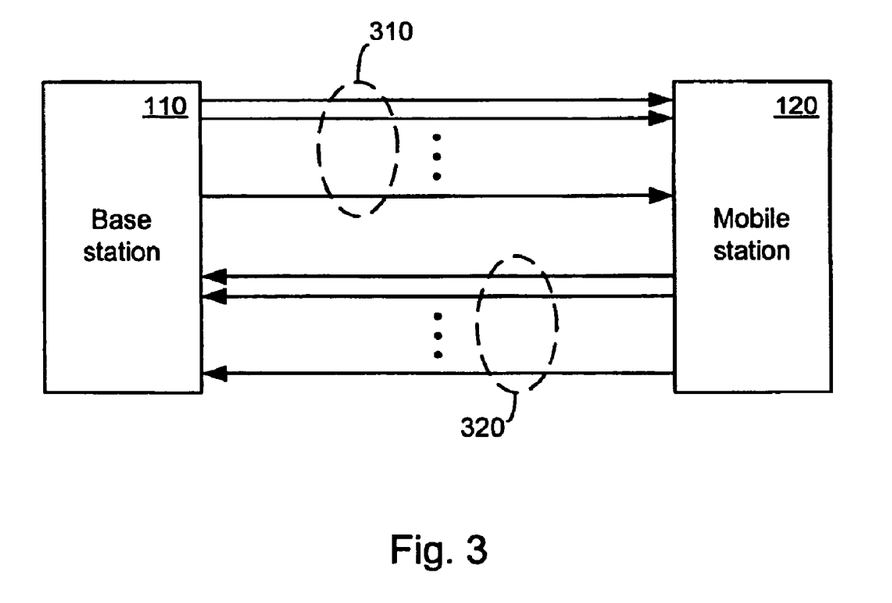
FIG. 3 is a diagram illustrating multiple channels between the mobile station and base station in accordance with one embodiment.

As indicated above, the communication link between the base station and the mobile station actually comprises various channels. Referring to FIG. 3, a diagram illustrating multiple channels between the mobile station and base station is shown. As depicted in the figure, Base station 110 transmits data to mobile station 120 via a set of forward link channels 310. These channels typically include both traffic channels, over which data is transmitted, and control channels, over which control signals are transmitted. Each of the traffic channels generally has one or more control channels associated with it. Forward link channels 310 may include, for example, a Forward Fundamental Channel (F-FCH) that may be used to transmit low-speed data, a Forward Supplemental Channel (F-SCH) that may be used for high-speed, point-to-point communications, or a Forward High-Speed Broadcast Channel (F-HSBCH) that may be used to broadcast messages to multiple recipients. The channels may also include a Forward Dedicated Control Channel (F-DCCH), a forward broadcast control channel (F-BCCH) or a Forward Paging Channel (F-PCH) that may be used to transmit control information relating to the traffic channels or to other aspects of the operation of the system.

Mobile station 120 transmits data to base station 110 via a set of reverse link channels 320. Again, these channels typically include both traffic channels and control channels. Mobile station 120 may transmit data back to the base station over such channels as a reverse access channel (R-ACH), an extended reverse access channel (R-EACH), a reverse request channel (R-REQCH), a reverse enhanced supplemental channel (R-ESCH), a reverse dedicated control channel (R-DCCH), a reverse common control channel (R-CCCH), or a reverse rate indicator channel (R-RICH).

In many instances, reverse link capacity is interference limited. Base stations allocate available reverse link communication resources to mobile stations for efficient utilization to maximize throughput in accordance with Quality of Service (QoS) requirements for the various mobile stations.

Maximizing the use of the reverse link communication resources involves several factors. One factor to consider is the mix of scheduled reverse link transmissions from the different mobile stations, each of which may be experiencing varying channel quality at any given time. To increase overall throughput (the aggregate data transmitted by all the mobile stations in the cell), it is desirable for the entire reverse link to be fully utilized whenever there is reverse link data to be sent. To fill the available capacity, some mobile stations may be granted access at the highest rate they can support. Additional mobile stations may be granted access until capacity is reached. In deciding which mobile stations to schedule, the base station may therefore consider the maximum rate each mobile station can support, the efficiency of the transmission from the mobile station, and the amount of data each mobile station has to transmit. A mobile station capable of higher throughput (considering both the data rate supportable by the mobile station and the amount of data the mobile station has to transmit) may be selected instead of an alternate mobile station that cannot currently support the higher throughput.

Another factor to be considered is the quality of service required by each mobile station. It may be permissible to delay access to a particular mobile station in hopes that the mobile station's channel (or more specifically its supportable throughput) will improve, instead selecting mobile station that can support higher throughput. It may be the case, however, that a sub-optimal mobile station may need to be granted access in order to allow the mobile station to meet minimum quality of service guarantees. Therefore, the data throughput that is actually scheduled may not be the absolute maximum, but may instead be optimized in light of channel conditions, available mobile station transmit power, quality of service requirements, and similar factors.

Various scheduling mechanisms may be used to allow a mobile station to transmit data on the reverse link. One class of reverse link transmissions involves a sporadic, burst oriented data transmission channel such as an R-ESCH, and the channel's accompanying rate indicator channel (R-RICH). When the R-ESCH is transmitting data, the R-RICH carries a corresponding non-zero rate packet. This non-zero rate packet on the R-RICH signals the base station as to the transmit format on the corresponding R-ESCH, provides a sub-packet identifier and a payload size, drives the power control loop when necessary and may provide additional pilot energy for demodulation and decoding of the R-ESCH.

Conversely, when the R-ESCH is not transmitting, the R-RICH transmits a zero-rate packet periodically, usually at a fixed frame boundary such as the boundary of 80 ms frames. The rate indicator packet may have a length that is less than the frame length (e.g. 10 ms) so that the duty cycle of the R-RICH may be less than 100% when only zero-rate packets are being transmitted.

A mobile station may move within the area serviced by a base station, changing the power requirements for a data transmission on the R-ESCH. This zero-rate packet is used to provide some information to drive the power control loop and ensure accurate and efficient transmissions. If the power control loop is not maintained, transmissions on the R-ESCH may be erased because of inadequate power, or the mobile station may utilize more power than necessary in transmission, decreasing its energy efficiency.

Because of the non-continuous nature of transmissions on the R-ESCH and R-RICH, the base station must make a determination when a packet is present on the R-RICH, and if the transmission frames of the R-RICH and its corresponding R-ESCH are valid. Conventionally, there was no need for an R-RICH, as transmission on data channels was more or less continuous and the transmission format of the data channels was known to the base station. In other words, detection and decoding of data frames and control of the power loop could be preformed based essentially on the data transmission channel itself. In the present system, the mobile station can decide whether to transmit on the R-ESCH and at what rate, as long as the data rate on the R-ESCH is not higher than the authorized rate from the base station. Both a data transmission channel (R-ESCH) and a control channel (R-RICH) are involved because of the above nature of the R-ESCH, and consequently, since transmission on the corresponding R-RICH is not continuous and the transmission format of the data channel is unknown to the base station, there is a need to detect the presence of packets on the R-RICH and the validity of associated transmission frames.

Figure 4:
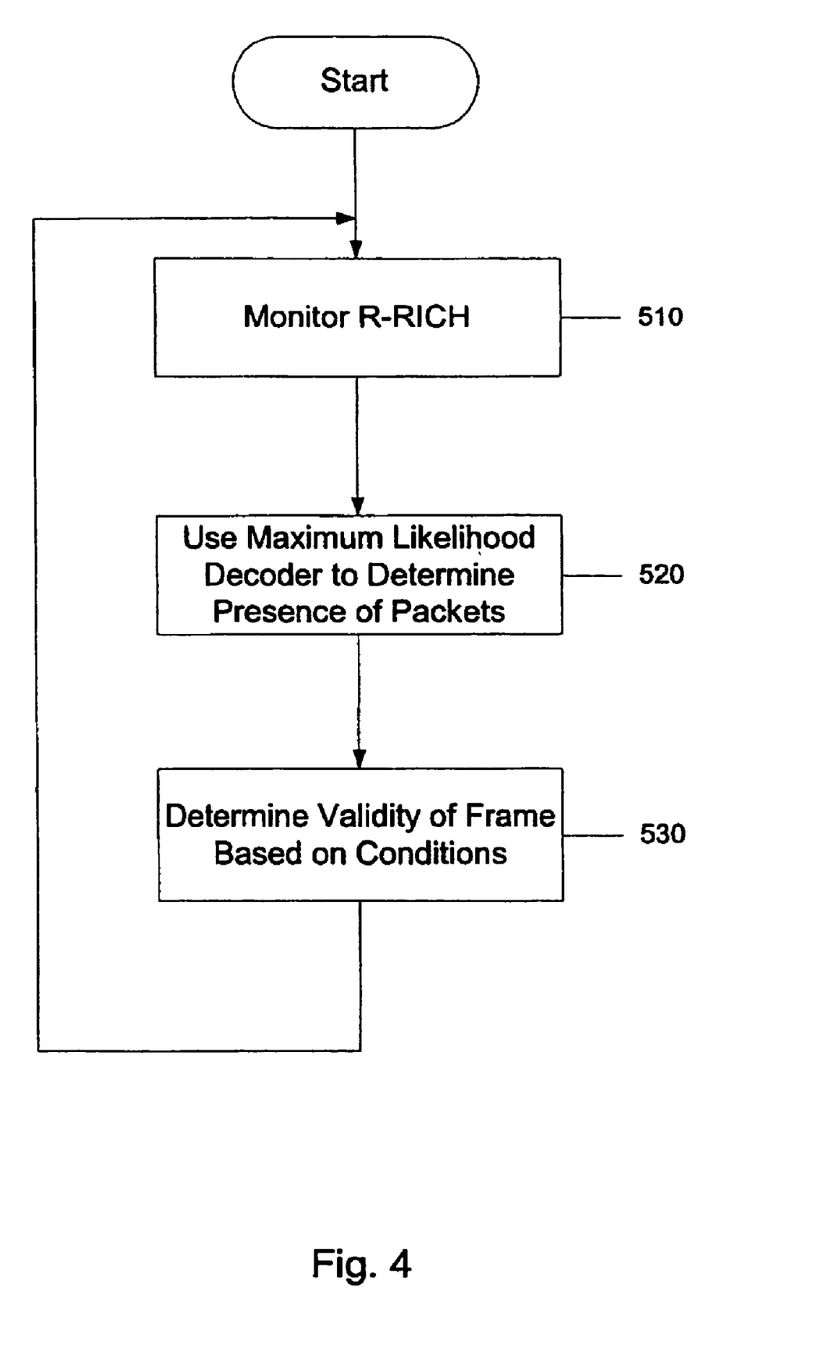
FIG. 4 is a diagram illustrating one general embodiment of the present invention to determine the validity of frames on a rate indicator channel and a corresponding burst oriented data channel via the detection and evaluation of packets on the rate indicator channel.

A flow diagram depicting an overview of methods employed by embodiments of the present invention for determining the validity of a transmission frame is depicted in FIG. 4. Generally, these methods may be used in conjunction with a spontaneous, burst oriented transmission channel such as an R-ESCH and the data channel's corresponding rate indicator channel such as an R-RICH which may transmit its zero-rate packets on a fixed and specified frame boundary. In one embodiment, an R-RICH is monitored (block 510), and a maximum likelihood decoder is used to determine the presence of packets on the monitored R-RICH (block 520). Based on the presence or absence of packets and the associated conditions the validity of one or more transmission frames on the R-RICH and its corresponding R-ESCH may be determined (block 530).

Figure 5:
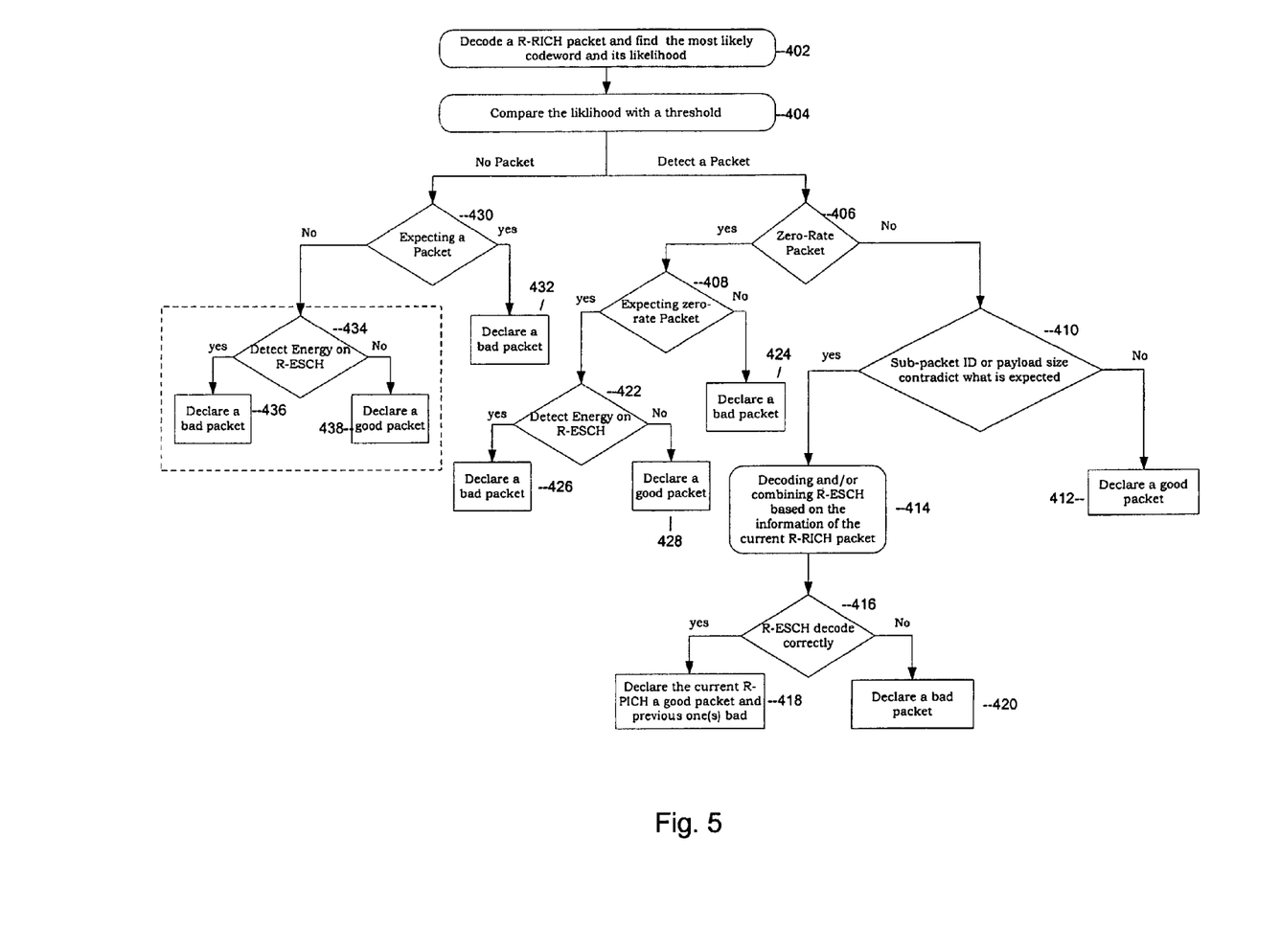
FIG. 5 is a flow diagram illustrating a method used in conjunction with a rate indicator channel and a corresponding burst oriented data channel to detect packets on the rate indicator channel and evaluate the validity of frames on the channels.

Turning now to FIG. 5, a flow diagram illustrating in more detail the methods employed to detect the presence of packets on a channel and the validity of associated frames is depicted. When monitoring an R-RICH a base station can detect the presence of packets by decoding the R-RICH to generate a likelihood of each possible codeword (block 402) and comparing the likelihood of the most likely codeword with a threshold (block 404), based on this comparison it can be determined initially whether a packet is present on the R-RICH. The packet, or lack thereof, can then be analyzed to determine the validity of transmission frames. In one embodiment, the first step in detecting packets on the R-RICH is to decode the R-RICH at every frame boundary (block 402) such as the boundary of 10 ms frames. Since the R-RICH may utilize a short block code a maximum-likelihood (ML) decoder may be used to identify a most likely codeword (W) and an associated likelihood (L) of the presence of that codeword on the R-RICH. The likelihood (L) of the most likely codeword (W) can then be compared against a threshold (Th) (block 404). If the likelihood (L) of the most likely codeword (W) is greater than some threshold level (L>Th), it may be decided that a packet has been detected on the R-RICH channel. Otherwise, it can be decided that no packet was detected on the R-RICH channel for the frame under analysis. While maximum likelihood decoders are well known in the art and have been implemented in the past to assign likelihoods to continuous bit streams, it is a novel approach to apply a maximum likelihood detector to determine the presence of packets on a discontinous transmission channel. In some embodiments of the present invention, the maximum likelihood decoder may be implemented as a bank of correlators.

Referring again to FIG. 5, based upon the base station's detection of a packet on the R-RICH, the validity of the transmission for the frame can then be determined. If the likelihood (L) of the most likely codeword (W) is greater than some threshold level (L>Th), it may be determined that a packet is present on the R-RICH (block 404). If a packet is present on the R-RICH, the base station may then analyze the packet and determine if the packet detected on the R-RICH is a zero-rate packet (block 406). If the base station determines that a zero-rate packet is present (block 406) and it was not expecting a zero-rate packet (block 408), for example if a zero-rate packet is detected at a time other than the specified frame boundary, it can be determined that the frame is invalid (block 424). Conversely, if the base station was expecting a zero-rate packet (block 408) a good frame may be declared. In many embodiments, if a zero-rate packet was expected (block 408) the base station may use the corresponding R-ESCH to further evaluate the validity of the frame (block 422). If enough energy is detected on the R-ESCH to determine that there is data present (block 422) this belies the zero-rate packet detected on the R-RICH (block 406), and because of this discrepancy the frame may be declared invalid (block 426). If, however, the energy detected on the corresponding R-RESCH (block 422) is congruent with the zero-rate packet detected (block 406) a good frame may be declared on the R-RICH (block 428).

If base station detects the presence of a packet (block 404) and it is not a zero-rate packet (block 406) it may analyze the contents of the detected packet (block 410). This analysis (block 410) may be based on the pre-determined timing for synchronous incremental redundancy (SIR), and a pre-defined order of sub-packet identifiers (ID) in transmissions on the R-RICH. In many embodiments, packets on the R-RICH contain a sub-packet ID and a payload. When a packet on the R-ESCH is initially transmitted from mobile station 120 to base station the packet on the R-RICH contains a sub-packet ID of 0, if the base station receives the frame an acknowledgement (ACK) is transmitted to the mobile station 120. If mobile station 120 receives the ACK it will transmit a new packet on the R-ESCH with a sub-packet ID of 0. If, however, the mobile station does not receive the ACK it may retransmit the original packet and increment the sub-packet ID. This cycle continues until mobile station 120 receives an ACK from base station. Base station may analyze these sub-packet IDs (block 410) to determine the validity of the detected packet. If the sub-packet ID does not contradict what base station expects, a good frame may be declared (block 412). When the sub-packet ID does contradict what base station expects a bad packet may be declared. This may happen, for example, if base station previously sent an ACK to mobile station 120. Base station may expect the next sub-packet ID to be 0, if it receives a packet with a sub-packet ID other than 0 a bad frame can be declared. For a mobile station in soft handoff, where the mobile station communicates with multiple base stations, even when a base station did not previously send an ACK to the mobile station but receives a new packet with sub-packet ID equal to 0, the base station considers that the new packet does not contradict it's the base station's expectation, as the previous packet may be ACKed by other base stations.

In a similar manner, if base station detects the presence of a packet (block 404) and it is not a zero-rate packet (block 406) it may analyze the payload of the detected packet (block 410). For example, base station may be expecting two R-RICH packets corresponding to the same encoder packet on the R-ESCH to have the same payload. If these expectations are met (block 410) a good frame may be declared, however, if the payload of these packets contradicts base station's expectations a bad frame may be declared. A good frame may be declared if both the sub-packet ID and the payload size match the expectations of the base station.

In many embodiments, when the sub-packet ID or payload is not what base station expects (block 410) the information present on the R-ESCH is used to further evaluate the validity of the current R-RICH frame. If a non zero-rate packet is detected on the R-RICH (block 404) with a proper sub-packet ID and payload (block 410), the information (payload size and sub-packet ID) in this packet can be used to decode the corresponding information present on the R-ESCH (block 414). If the R-ESCH decodes incorrectly (block 416) this indicates that the information on the R-RICH and the corresponding R-ESCH may not be consistent and a bad frame may be declared (block 420). If, however, the R-ESCH is correctly decoded based on the information contained in the corresponding R-RICH packet (block 416) a good frame may be declared (block 418). Additionally in this case, one or more of the previous packets on the R-RICH may be declared bad based on the contradiction between the current good frame and the incorrect expectations derived from information contained in one or more of the previous packets of the R-RICH (block 418).

Returning to the top of FIG. 5, if the base station decodes an R-RICH packet to generate a likelihood (block 402), and the likelihood (L) of the most likely codeword (W) is less than some threshold level (L<Th), it may be determined that no packet is present on the R-RICH (block 404). If the base station was expecting a zero-rate packet on the R-RICH (block 430) a bad frame may be declared (block 432). Conversely, if no zero-rate packet was expected a good frame may be declared.

In many embodiments, if a packet was not detected (block 404) on the R-RICH and no zero-rate packet was expected (block 430), the corresponding R-ESCH may be used to help assess the validity of the frame. If the energy is strong enough on the R-ESCH (block 434), contravening the indications of the R-RICH, a bad frame may be declared (block 436). If, however, the energy level (block 434) and the R-RICH channel are congruous a good frame may be declared (block 438).

The various aspects and features of the present invention have been described above with regard to specific embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment. Additionally, the steps of the disclosed methods are presented in no particular order and may be interchanged without departing from the scope of the claimed invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for evaluating packets and frames in a wireless communication system having a burst oriented channel, and a corresponding rate indicator channel, the method comprising:
   monitoring the rate indicator channel;
   determining the presence of a packet on the rate indicator channel based on a likelihood generated by a maximum likelihood decoder that decodes the rate indicator channel; and
   analyzing the packet, if detected, to determine whether a frame is valid based on a comparison between a sub-packet identifier (ID) and payload size of the packet with a sub-packet ID and payload size of one or more previous packets.

2. The method of claim 1 wherein analyzing the packet further comprises comparing the packet with an expected packet type if the packet is a zero-rate packet.

3. The method of claim 2 wherein analyzing the packet further comprises detecting energy on the burst oriented data channel if the packet matches the expected packet type.

4. The method of claim 1 wherein further comprising:
   determining the validity of the frame based upon a detection of energy on the burst oriented channel if there is no packet on the corresponding rate indicator channel and no packet was expected.

5. The method of claim 1, wherein determining the presence of a packet is performed at predetermined intervals.

6. The method of claim 5, wherein the interval is a sub-frame interval.

7. The method of claim 1, wherein analyzing the packet further comprises
   determining if the packet is a zero-rate packet, and analyzing the sub-packet ID and the payload of the packet if the packet is not a zero-rate packet.

8. The method of claim 7 wherein analyzing the packet further comprises
   decoding information on the burst oriented data transmission channel using the packet if the sub-packet ID and payload are not expected.

9. The method of claim 1, wherein the packet does not include cyclical redundancy check (CRC) bits.

10. The method of claim 1, wherein the determining the presence of the packet includes:
    comparing the likelihood with a threshold,
    wherein the determination as to whether the packet is present is based on the comparison.

11. The method of claim 1, wherein the determining the presence of the packet includes:
    identifying a codeword that is most likely to be present on the rate indicator channel,
    wherein the likelihood corresponds to the likelihood that the most likely codeword is present on the rate indicator channel.

12. The method of claim 1, wherein the rate indicator channel is a discontinuous transmission channel.

13. A system for evaluating packets and frames in a wireless communication system, comprising:
    a base station; and
    a mobile station coupled to the base station via a wireless communication link;
    wherein the base station is configured to receive data from the mobile station on a plurality of reverse-link channels on the wireless communication link including a burst oriented channel, and a corresponding rate indicator channel; and
    wherein the base station is configured to monitor the rate indicator channel, determine the presence of a packet on the rate indicator channel based on a likelihood generated by a maximum likelihood decoder that decodes the rate indicator channel and analyze the packet, if detected, to determine whether a frame is valid based on a comparison between a sub-packet identifier (ID) and payload size of the packet with a sub-packet ID and payload size of one or more previous packets.

14. The system of claim 13 wherein the base station is configured to analyze the packet by comparing the packet with an expected packet type if the packet is a zero-rate packet.

15. The system of claim 14 wherein the base station is configured to analyze the packet by detecting energy on the burst oriented channel if the packet matches the expected packet type.

16. The system of claim 13 wherein the base station is further configured to determine the validity of the frame by detecting energy on the burst oriented channel if there is no packet on the corresponding rate indicator channel and no packet was expected.

17. The system of claim 13, wherein the presence of a packet is determined at predetermined intervals.

18. The system of claim 17, wherein the interval is a sub-frame interval.

19. The system of claim 13, wherein the base station is configured to analyze the packet by determining if the packet is a zero-rate packet, and analyzing the sub-packet ID and the payload of the packet if the packet is not a zero-rate packet.

20. The system of claim 19 wherein the base station is further configured to analyze the packet by decoding information on the burst oriented data transmission channel using the packet if the sub-packet ID and payload are expected.

21. A base station operable to communicate with a mobile station via a wireless communication channel, wherein the base station comprises:
    a processing subsystem; and
    a transceiver subsystem coupled to the processing subsystem;
    wherein the transceiver subsystem is configured to receive signals on a plurality of reverse-link channels on the wireless communication link including a burst oriented channel, and a corresponding rate indicator channel; and
    wherein the base station is configured to monitor the rate indicator channel, determine the presence of a packet on the rate indicator channel based on a likelihood generated by a maximum likelihood decoder that decodes the rate indicator channel and analyze the packet, if detected, to determine whether a frame is valid based on a comparison between a sub-packet identifier (ID) and payload size of the packet with a sub-packet ID and payload size of one or more previous packets.

22. The base station of claim 21 wherein the base station is configured to analyze the packet by comparing the packet with an expected packet type if the packet is a zero-rate packet.

23. The base station of claim 22 wherein the base station is configured to analyze the packet by detecting energy on the burst oriented channel if the packet matches the expected packet type.

24. The base station of claim 21 wherein the base station is further configured to determine the validity of the frame by detecting energy on the burst oriented channel if there is no packet on the corresponding rate indicator channel and no packet was expected.

25. The base station of claim 21, wherein the presence of a packet is determined at predetermined intervals.

26. The base station of claim 25, wherein the interval is a subframe interval.

27. The base station of claim 21, wherein the base station is configured to analyze the packet by determining if the packet is a zero-rate packet, and analyzing the sub-packet ID and the payload of the packet if the packet is not a zero-rate packet.

28. The base station of claim 27 wherein the base station is further configured to analyze the packet by decoding information on the burst oriented data transmission channel using the packet if the sub-packet ID and payload are expected.

29. An apparatus operable to communicate with a mobile station via a wireless communication channel, wherein the base station comprises:
   means for monitoring the rate indicator channel;
   means for determining the presence of a packet on the rate indicator channel based on a likelihood generated by a maximum likelihood decoder that decodes the rate indicator channel; and
   means for analyzing the packet, if detected, to determine whether a frame is valid based on a comparison between a sub-packet identifier (ID) and payload size of the packet with a sub-packet ID and payload size of one or more previous packets.

30. The apparatus of claim 29, wherein the means for determining determines the presence of a packet at predetermined intervals.

31. The apparatus of claim 30, wherein the interval is a subframe interval.

32. A non-transitory computer-readable storage medium including program code stored thereon, which when executed by a processor is for evaluating packets and frames in a wireless communication system having a burst oriented channel, and a corresponding rate indicator channel, comprising:
   logic configured to monitor the rate indicator channel;
   logic configured to determine the presence of a packet on the rate indicator channel based on a likelihood generated by a maximum likelihood decoder that decodes the rate indicator channel; and
   logic configured to analyze the packet, if detected, to determine whether a frame is valid based on a comparison between a sub-packet identifier (ID) and payload size of the packet with a sub-packet ID and payload size of one or more previous packets.

33. The apparatus of claim 32, wherein the logic configured to determine determines the presence of a packet at predetermined intervals.

34. The apparatus of claim 33, wherein the interval is a subframe interval.

* * * * *